United States Patent [19]
McMorrow

[11] Patent Number: 6,061,920
[45] Date of Patent: May 16, 2000

[54] MEASURING DEVICE FOR TOPOGRAPHICAL MAPS

[76] Inventor: John J. McMorrow, 1045 Pache Rd., Belgrade, Mont. 59714

[21] Appl. No.: 09/188,564

[22] Filed: Nov. 10, 1998

[51] Int. Cl.[7] .............................. B43L 7/00; G01B 3/04
[52] U.S. Cl. .................. 33/494; 33/492; 33/458
[58] Field of Search ............. 33/492, 483, 494, 33/458, 465, 488

[56] References Cited

U.S. PATENT DOCUMENTS

| | | |
|---|---|---|
| 291,429 | 1/1884 | Tuttle . |
| 443,652 | 12/1890 | Jewell et al. ............... 33/483 |
| 1,497,492 | 6/1924 | Engel . |
| 1,728,420 | 9/1929 | Little ........................... 33/492 |
| 2,736,097 | 2/1956 | Coleman ..................... 33/488 |
| 3,837,569 | 9/1974 | Bradbury et al. ........... 235/70 R |
| 4,217,696 | 8/1980 | Schindler . |
| 4,314,408 | 2/1982 | Shoemaker ................. 33/494 |
| 4,426,790 | 1/1984 | Kimel .......................... 33/458 |
| 4,484,395 | 11/1984 | Samuels . |
| 4,562,649 | 1/1986 | Ciavarella ................... 33/465 |
| 4,641,436 | 2/1987 | Tzen et al. . |
| 4,734,993 | 4/1988 | Pan . |
| 5,014,438 | 5/1991 | Gravel ......................... 33/494 |
| 5,020,233 | 6/1991 | Syken .......................... 33/465 |
| 5,479,719 | 1/1996 | Liu . |
| 5,664,334 | 9/1997 | Watts . |
| 5,735,058 | 4/1998 | Jimenez ....................... 33/494 |
| 5,771,598 | 6/1998 | Lassberg ..................... 33/492 |
| 5,822,875 | 10/1998 | Feldner ....................... 33/494 |

FOREIGN PATENT DOCUMENTS

| | | |
|---|---|---|
| 1131667 | 10/1956 | France ......................... 33/492 |
| 534332 | 9/1931 | Germany ..................... 33/465 |
| 556546 | 2/1957 | Italy ............................. 33/492 |
| 273116 | 1/1954 | Switzerland . |
| 2216265 | 10/1989 | United Kingdom . |

*Primary Examiner*—Diego Gutierrez
*Assistant Examiner*—Quyen Doan
*Attorney, Agent, or Firm*—Richard C. Litman

[57] ABSTRACT

A transparent measuring device for topographical maps is graduated for converting a particular map scale in units of yards and/or fractions of a mile. The measuring device has a substantially rectangular body having a first, second and third top face, a first and second side surface and a bottom surface. The third top face is disposed between said first and second faces as a distinct magnifier. The first top face has a graduated scale including indicia for designating a measuring scale in units of yards. The second top face has a complimentary graduated scale including indicia for designating a measuring scale in units of miles which is directly correlated with measurements made in units of yards on the first face by a scalar conversion factor. A plurality of the measuring scales are attached at single point as and forms a unitary kit of measuring devices for measurements requiring different scales.

9 Claims, 4 Drawing Sheets

MEASURING DEVICE FOR TOPOGRAPHICAL MAPS

BACKGROUND OF THE INVENTION

1. Field of the Invention

The present invention relates generally to distance measuring devices. More specifically, the invention is a ruler having one or multiple scales for directly reading horizontal distances or elevations on topographical maps in yards and miles.

2. Description of the Related Art

A wide variety of measuring devices have been devised for measuring distances according to specific scale magnitudes and units depending on the area of application. For the average nature enthusiasts, however, a measuring device which measures horizontal distances or elevations for topographical maps as herein described is wanting. Invariably, avid hikers find it necessary to determine travel progress whether in mountains, rain forests, wilderness, etc., by estimating distances of completed travel or remaining distance of travel via natural landmarks, solar activity, including more advanced or technical means such as the use of hand-held measuring devices. For example, costly devices such as global positioning systems and more conventional devices such as magnetic compasses, etc. have been used by hikers to aide in determining there directional bearings in various locations, but the more critical data which describes changes in elevations or physical data regarding the terrain, etc. is not provided by these devices. However, the measuring device according to the instant invention allows one to draw inference from such data wherein one measures topographical maps to ascertain the rigors of the terrain and whether one has sufficient energy or stamina to continue a course of direction or alter the course to reach a particular destination.

While an experienced hiker could probably survive without devices such as compasses, rulers or natural landmarks, a measuring device for measuring distances on topographical maps as herein described is quite useful in aiding a hiker or ground rescue team for that matter in determining local topographical data to cover areas wherein persons may be found thereby conserving energy to meet or alter destination plans according to the rigors of a certain environmental domain of search. Most of the conventional devices used by hikers as described hereinbelow are lacking in this critical area.

For example, U.S. Pat. No. 291,429 issued to Tuttle discloses a conventional graduated scale which measures distance in inches and centimeters. If a drawing is on a scale of one hundred feet to the inch, a fiftieth scale is used. In the case the number of feet is even—for instance, two hundred and forty—ten inches are measured off from the zero toward the left of the measuring device, and forty feet (equal to twenty on the fiftieths scale) are measured off on the same. There is no explicit teaching wherein topographical measurement are made in corresponding yard and mile measurements as herein described.

U.S. Pat. No. 1,497,492 issue to Engel discloses a multiple scale instrument for making measurements in feet and inches in particular. Although beneficial in some applications wherein logarithmic scales are needed, the multiple scale device taught by Engel is quite complex to use. The device according to the instant invention is quite simple to use as measurements from topographical maps are readily obtained.

U.S. Pat. No. 4,217,696 issued to Schindler discloses a time-distance device for measuring linear or curvilinear map distance and determining the rate or time of travel represented by such distance. The device includes an elongated, hollow body having a slot extending along a portion of its length, an indicator shiftable along the slot, and a traction element rotatably mounted at one end of the body. The device according to the instant invention is substantially rectangular and does require a rotatable cylindrical member. The Russian Patent No. 2216265 issued to Balley also discloses a time distance map reading aide having a scale calibrated in a personal mobility parameter. The device includes four scales indicating walking speeds ½, 1½, 2½ and 3½ miles per hour.

U.S. Pat. Nos. issued to Samuels (4,484,395), Tzen (4,641,436) and Pan (4,734,993) disclose straight edge measuring devices which are capable of measuring both horizontal and perpendicular distances. The latter U.S. Patents issued to both Tzen and Pan provide such measurements simultaneously via L-shaped measuring scales.

U.S. Pat. No. 5,479,719 issued to Liu discloses a triangular shaped multi-scale rolling ruler. The ruler is made roll along a planar surface and to rotate to arrange an alternate scale in place for appropriate measurements. The primary purpose of this particular design is to improve the drawing of parallel lines of different scales by preventing ink from contaminating a work sheet. This device is completely different than that of the instant invention in that there are no requirements for the rolling features to obviate ink contamination on a work sheet as recited above. Other Patents which are generally relevant to the instant invention are those issued to Watts (U.S. Pat. No. 5,664,334) and Socina (CH 273116) which disclose measuring devices which determine the angle of inclination of a portion of terrain from a topographical map for example.

None of the above inventions and patents, taken either singularly or in combination, is seen to describe the instant invention as claimed. Thus a measuring device for topographical maps solving the aforementioned problems is desired.

SUMMARY OF THE INVENTION

The measuring device for topographical maps according to the invention is composed of a transparent plastic material which is graduated for converting a particular map scale in units of yards and/or fractions of a mile. The measuring device has a substantially rectangular body having a first, second and third top face, a first and second side surface and a bottom surface. The third top face is disposed between said first and second faces as a distinct magnifier. The first top face further comprises a graduated scale including indicia for designating a measuring scale in units of yards. The second top face has a complimentary graduated scale including indicia for designating a measuring scale in units of miles which is directly correlated with measurements made in units of yards on the first face by a scalar conversion factor. A plurality of the measuring scales are rivet as unitary kit of measuring devices for measurements requiring different scales.

Accordingly, it is a principal object of the invention to provide a measuring device for topographical measurements which is lightweight.

It is another object of the invention to provide a measuring device for topographical measurements which is transparent.

It is a further object of the invention to provide a measuring device for topographical measurements which measures distance in units of yards and miles.

Still another object of the invention is to provide a measuring device for topographical measurements which directly correlates each distance measurements in units of yards to a distance measurement in miles and vice versa.

Further still another object of the invention is to provide a measuring device for topographical measurements which magnifies topographical map data for ease of visualization by a user.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a measuring device for topographical maps which provides measurements in yards and miles. The preferred embodiments of the present invention are depicted in FIGS. 1 and 4 in particular, and are generally reference by numerals 5 and 7, respectively.

Figure 1:
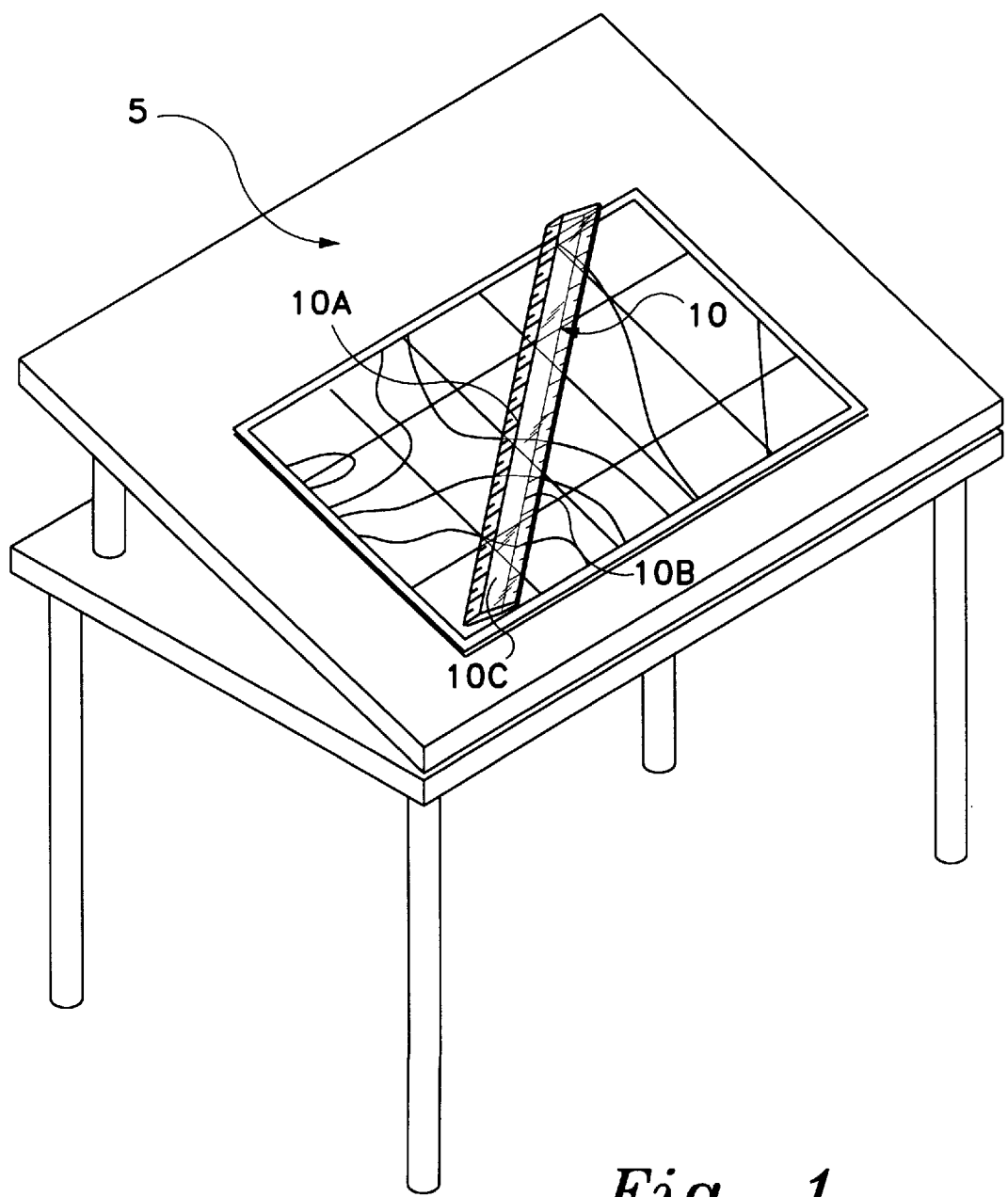
FIG. 1 is an environmental perspective view of the measuring device for topographical maps according to the present invention.
Figure 2:
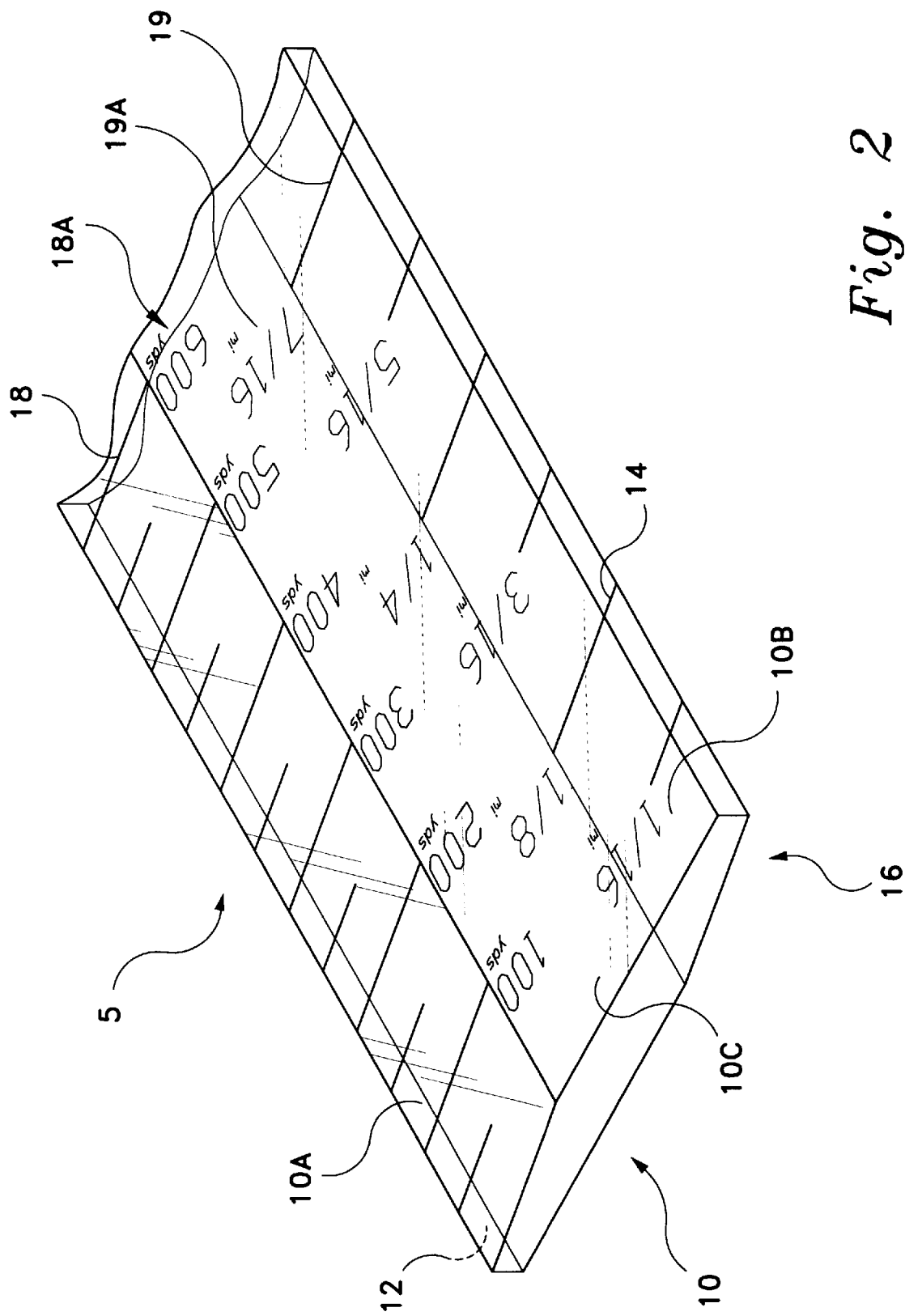
FIG. 2 is an expanded view of the measuring device according to the invention.

As best seen in FIGS. 1 and 2, the measuring device for topographical measurements comprises the measuring device 5 having a substantially rectangular body 10, the body having a first 10a, second 10b and third 10c top face, a first 12 and second 14 side surface and a bottom 16 surface. The device 5 is preferably made of a durable transparent and scratch resistant plastic or crystalline material which allow quick and easy optically read distance measurements via the device 5. In this regard, the third top face 10c is disposed between the first 10a and second 10b faces as a distinct magnifying lens. The magnifying effect can be a single magnification lens or a magnification lens having a plurality of magnification factors disposed within the third face 10c depending on the intended use of the device 5. In either event the third face 10c improves visualization of the topographical data.

The first top face 10a further comprises a graduated scale 18 including indicia 18a for designating a measuring scale in units of yards. The second top face 10b having a complimentary graduated scale 19 including indicia 19a for designating a measuring scale in units of miles. Each scale 18 and 19 are related by a scalar conversion factor for obtaining measurement in either aforementioned measured unit. As seen in FIG. 2, the first face 10a indicates a graduate scale 18 wherein each division is equal to 50 yards. On the second face 10b, the graduate scale 19 indicates graduated divisions each of which is 1/16 of a mile or equivalently 110 yards. The magnitude of each scale can vary to include measurement varying according to a particular topographical map scale.

Figure 3:
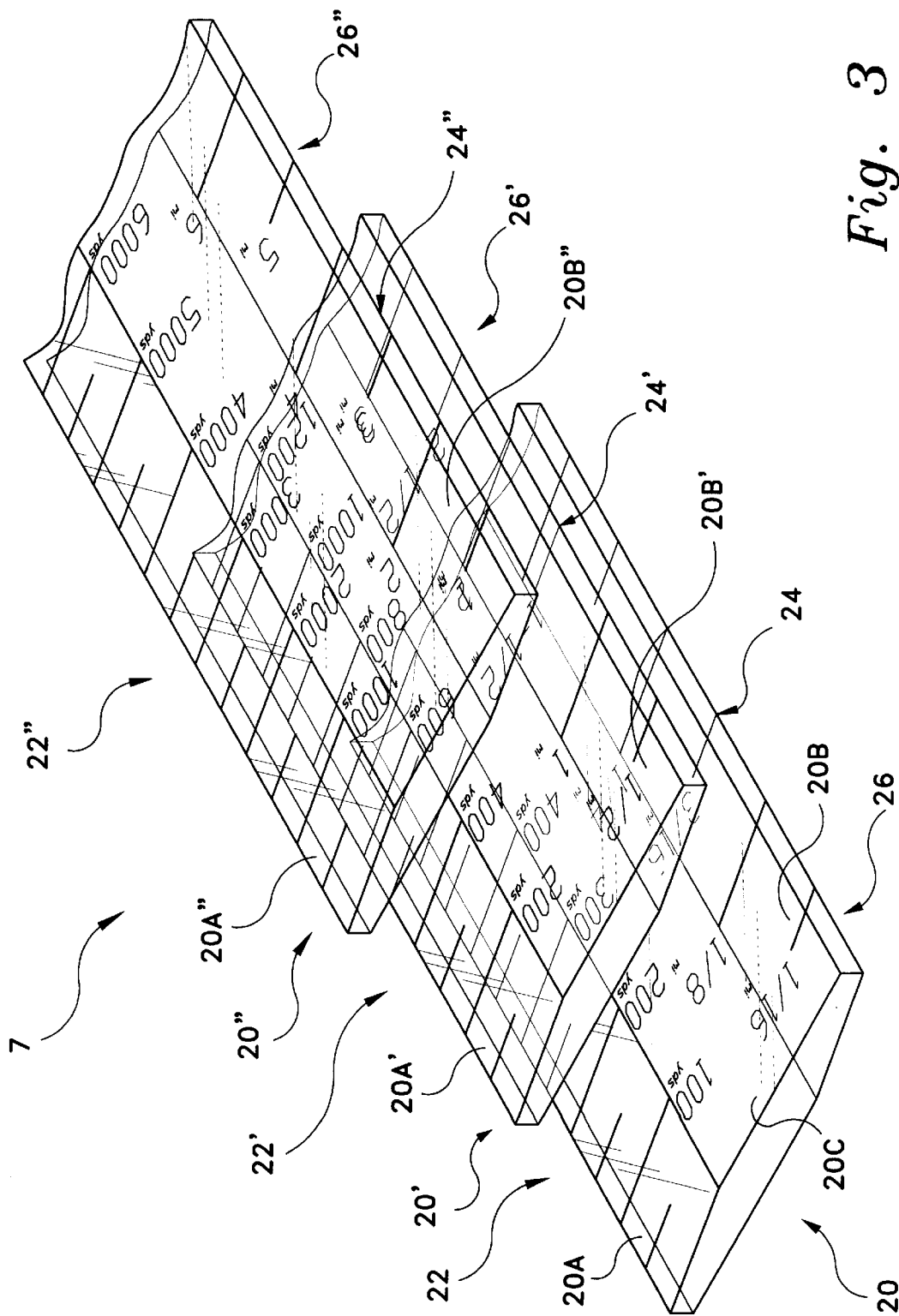
FIG. 3 is an expanded view of FIG. 2, illustrating a plurality of measuring devices as a kit having varying measuring scales according to a stacked arrangement.
Figure 4:
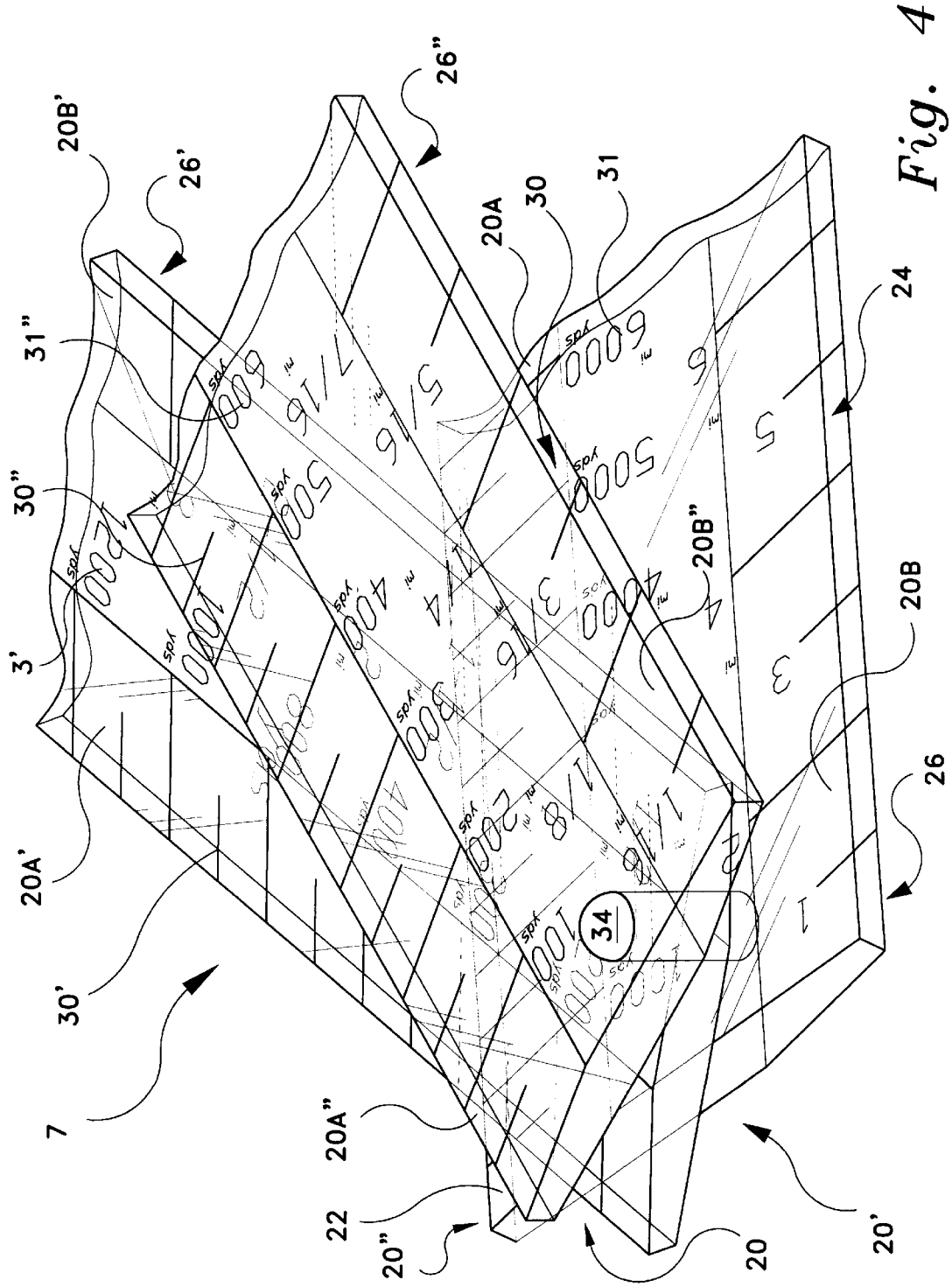
FIG. 4 is an expanded view of FIG. 2, illustrating a plurality of measuring devices as a kit having varying measuring scales according to a another embodiment of the invention.

According to a second embodiment of the invention, FIGS. 3 and 4, diagrammatically illustrates a measuring device kit 7 for topographical maps having a plurality of substantially rectangular body elements 20, 20' and 20". Each of the body elements 20, 20' and 20" having a first (20a, 20a', 20a", respectively) second (20b, 20b', 20b", respectively) and third (20c, 20c', 20c", respectively) top face, a first (22, 22' and 22") and second (24, 24' and 24") side surface and a bottom surface (26, 26' and 26"). As similarly described above, the third top face (20c, 20c' and 20c") shown for each respective body element in FIGS. 3 and 4, respectively is interpose or disposed between the top (20a, 20a', 20a", respectively) and second (20b, 20b', 20b", respectively) respective top faces as a distinct magnifier lens. The magnification can be a single magnification lens or a plurality of such lens depending on the intended use of the third respective face. When used as a kit each body element or device 7 would preferably have a different magnification scheme.

As similarly described above, the first top face (20a, 20a', 20a", respectively) for each of the plurality of body elements 20, 20' and 20" further comprises a graduated scale (30, 30' and 30"). Each scale varying respectively by a scalar factor and including indicia (31, 31' and 31", respectively) for designating a measuring scale in units of yards. Likewise, each of the respective second top faces (20b, 20b' and 20b") have a complimentary graduated scale (32, 32' and 32") including indicia (33, 33' and 33", respectively) for designating a measuring scale in units of miles. The significant difference of the embodiments diagrammatically illustrated in FIGS. 1–3 and that illustrated in FIG. 4 is a binding means 34 is used to rotatably binding each of plurality of body elements (20, 20' and 20") at one point for individual rotation about a that point. This can binding means can include any other mechanical fastener so long as the fastener is used within the scope of the invention as herein disclosed.

It is to be understood that the present invention is not limited to the embodiments described above, but encompasses any and all embodiments within the scope of the following claims.

What is claimed is:

1. A measuring device for converting distances on a topographical map drawn to a reduced scale directly to miles and yards, said measuring device comprising:

a substantially rectangular body made of transparent material, said body having first, second and third top faces, first and second side surfaces and a bottom surface, said third top face being disposed between said first and second top faces, said first top face further including a first graduated scale designated in units of yards corresponding to the reduced scale of the topographical map; and said second top face further including a second graduated scale designated in units of miles corresponding to the reduced scale of the topographical map.

2. The measuring device according to claim 1, wherein said body is made of a scratch resistant material.

3. The measuring device according to claim 1, said third top face including magnification means for magnifying the topographical map.

4. A kit for converting distances on a topographical map drawn to a reduced scale directly to units of measurement, said kit comprising:

a plurality of measuring devices, each of said measuring devices including a substantially rectangular body made of a transparent material, each said body having first, second and third top faces, first and second side surfaces and a bottom surface, said third top face being disposed between said first and second top faces, each said first top face further including a graduated scale designated in a first unit of measure corresponding to the reduced scale of the topographical map; and each said second top face further including a graduated scale designated in a second unit of measure corresponding to the reduced scale of the topographical map.

5. The measuring device kit according to claim 4, wherein said body is made of a scratch resistant material.

6. The kit according to claim 4, each said third top face including magnification means for magnifying the topographical map.

7. The kit according to claim 4, wherein at least one of said first top faces includes a first graduated scale designated in units of yards corresponding to the reduced scale of the topographical map.

8. The kit according to claim 4, wherein at least one of said second top faces includes a second graduated scale designated in units of miles corresponding to the reduced scale of the topographical map.

9. The kit according to claim 4, including means for rotatably binding said plurality of measuring devices about a point.

* * * * *